US006442331B1

(12) United States Patent
Watkins

(10) Patent No.: US 6,442,331 B1
(45) Date of Patent: Aug. 27, 2002

(54) OPTICAL DISK SYSTEM INCORPORATING COMPUTER GRAPHICS RENDERING CAPABILITY TO CREATE AND DISPLAY THREE-DIMENSIONAL (3-D) OBJECTS SYNCHRONIZED WITH 3-D SOUND

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/112,106

(22) Filed: Jul. 8, 1998

(51) Int. Cl.[7] .............................. H04N 7/04; H04N 5/85; H04N 5/90
(52) U.S. Cl. ........................ 386/82; 386/105; 386/125
(58) Field of Search ........................ 386/82, 104, 105, 386/27, 106, 33, 109, 112, 125, 126, 39, 45, 46, 111, 124–40; H04N 7/04, 5/85, 5/90

(56) References Cited

U.S. PATENT DOCUMENTS 5,257,346 A * 10/1993 Hanson
5,815,632 A * 9/1998 Furuhashi
6,204,851 B1 * 3/2001 Netschke et al.

* cited by examiner

Primary Examiner—Robert Chevalier
(74) Attorney, Agent, or Firm—Conley, Rose & Tayon

(57) ABSTRACT

An optical disk system is presented which incorporates computer graphics rendering capability to create and display three-dimensional (3-D) objects synchronized with 3-D sound. The optical disk system includes an audio/video (A/V) decoder coupled to a microprocessor and a rendering unit. The A/V decoder and the microprocessor receive a bitstream including encoded video and audio data, 3-D presentation data, and navigation data. The 3-D presentation data includes object and audio modeling data, and may also include instructions executed by the microprocessor in order to perform an operation upon the object and audio modeling data. The object modeling data includes data pertaining to an object to be displayed upon a display device, and the audio modeling data includes data pertaining to sound to be produced by multiple speakers. The bitstream may be a DVD-compliant bitstream having an sub-picture unit (SPU) portion, and the 3-D presentation data may be conveyed using the SPU portion of the bitstream. The A/V decoder stores decoded video and audio data within an A/V memory unit. The microprocessor stores the 3-D presentation data within a 3-D memory unit. The rendering unit retrieves the object modeling data from the 3-D memory unit, performs a rendering function (e.g., a shading operation) upon the object modeling data producing image data, and stores the image data within the A/V memory unit. The A/V decoder retrieves the decoded video and image data from the A/V memory unit and provides the decoded video and image data to the display device.

43 Claims, 6 Drawing Sheets

OPTICAL DISK SYSTEM INCORPORATING COMPUTER GRAPHICS RENDERING CAPABILITY TO CREATE AND DISPLAY THREE-DIMENSIONAL (3-D) OBJECTS SYNCHRONIZED WITH 3-D SOUND

BACKGROUND OF THE INVENTION

1. Field of the Invention

This invention relates to optical disk systems, and in particular to an optical disk system including three-dimensional (3-D) graphics and sound capability.

2. Description of the Related Art

Optical disks are recording media which typically contain long strings of microscopic pits representing digitally encoded data. Each string of pits is called a "track". The tracks are formed end to end in a spiral pattern around the center of one or both major surfaces of the disk. Reflected laser light is used to "read" the data encoded in the pits. Common types of optical disks available today include compact disks (CDs), laser video disks, and digital versatile disks (DVDs). Various optical disk players are available reading data from optical disks.

Laser video disks and DVDs have storage capacities which exceed those of normal CDs, and are capable of storing full length movies and other presentations including video and audio information. A digitized version of a full length movie includes an enormous amount of digital video data. In order to reduce the amount of digital video data which must be stored, the digital video data is typically compressed and encoded according to a Moving Pictures Experts Group (MPEG) standard (e.g., MPEG-2). MPEG-2 compression removes redundant information (e.g., information relating to areas of images that don't change) and information not readily perceived by a viewer. The audio content of the movie is typically digitized, compressed, and encoded according to either a Dolby® AC-3™ or MPEG audio standard.

The current DVD standard is a compromise format agreed upon by several major consumer electronic and entertainment companies. Under the current DVD standard, the capacity of a single side, single layer DVD with a diameter of 4.7 inches is 4.7 gigabytes, enough to store about 135 minutes of MPEG-2 video data. This capacity is sufficient for about 95% of all full length movies. The current DVD standard also provides for up to eight different sound tracks in different languages. In addition, up to 32 different sets of subtitles may be stored on a DVD for display during playback.

Data retrieved from a spinning DVD by a DVD drive is typically conveyed as a data stream including compressed video and audio "substreams". The DVD standard also allows for an optional "navigation" substream to be included in the data stream. The navigation substream specifies ways in which a DVD system user can interact with the multimedia presentation. Inclusion of the navigation substream allows the multimedia presentation to become an interactive experience, allowing sequences of video and audio data to be assembled according to user input. For example, the navigation substream allows a user to choose which path to take in a given video scene.

Various interactive computer programs (e.g., games) exist which create the perception of movement through a virtual environment. The virtual environment typically includes images of objects and sounds. Many of these programs employ rendering techniques to make the objects appear to be three dimensional. For example, a rendering technique may first model the objects as frameworks of straight lines connected to form outlines (i.e., wireframe models). Portions of the lines which would not be visible to a viewer may then be removed. Such "hidden line removal" makes the objects appear solid. Color and texture may then be attributed to surfaces of the objects. One or more light sources may be defined, and one of various shading techniques may be employed to make the objects appear more realistic.

Optical disks (e.g., DVDs and laser video disks) now have the capacity to store enough video and audio data to recreate hours of moving images and synchronized sound. Existing optical disk technology is inadequate, however, to allow limitless movement through a virtual environment created by the moving images and sound. For example, encoding every possible permutation of a joystick used to navigate through the virtual environment would require too much storage space. In addition, current optical disk technology does not support the creation and display of 3-D objects at speeds possible using dedicated hardware employing computer graphics rendering techniques.

It would be beneficial to have an optical disk system which incorporates computer graphics rendering capability in order to create three-dimensional (3-D) objects synchronized with 3-D sound. Such an optical disk system would allow limitless navigation through a virtual environment, and would be useful for flight simulation, virtual tours of planned structures and historic buildings, games, etc.

SUMMARY OF THE INVENTION

The problems outlined above are in large part solved by an optical disk system which incorporates computer graphics rendering capability to create and display objects which appear to be three dimensional and synchronized 3-D sound. The optical disk system includes an audio/video decoder, a microprocessor, and a rendering unit. The audio/video decoder receives a serial train or stream of bits (i.e., a bitstream) including encoded video and audio data, 3-D presentation data, and navigation data. The encoded video and audio data may be encoded using an MPEG standard (e.g., MPEG-2). The 3-D presentation data includes object modeling data and audio modeling data. The object modeling data includes data pertaining to an object to be displayed upon a display device, and may include coordinate locations of pairs of points which define straight lines used to model the object. The audio modeling data includes data pertaining to sound to be produced by multiple speakers. The bitstream may be a DVD-compliant bitstream having an sub-picture unit (SPU) portion. The 3-D presentation data may be conveyed using the SPU portion of the bitstream.

The audio/video decoder obtains the encoded video data from the bitstream, decodes the encoded video data thereby producing decoded video data, and stores the decoded video data in an audio/video memory unit coupled to the audio/video decoder. The microprocessor also receives the bitstream, obtains the 3-D presentation data and the navigation data from the bitstream, and stores the 3-D presentation data in a 3-D memory unit coupled to the microprocessor.

The microprocessor executes software instructions which may be stored in a microprocessor memory unit coupled to the microprocessor. The 3-D presentation data may also include instructions executed by the microprocessor in order to perform an operation upon the 3-D presentation data. In this case, the microprocessor stores the instructions within the microprocessor memory unit.

The navigation data defines a set of optional next sequences of encoded video data, 3-D presentation data, and navigation data to be included in the bitstream. An input device may be operably coupled to the microprocessor and may produce an output signal in response to user input. The microprocessor may produce control signals in response to the navigation data and/or the output signal. The control signals may be used to select a member of the set of optional next sequences of encoded video data, 3-D presentation data, and navigation data.

The microprocessor is also coupled to the audio/video memory unit. The microprocessor may retrieve the object modeling data from the 3-D memory unit, perform a graphics function upon the object modeling data thereby producing image data, and store the image data within the audio/video memory unit. The microprocessor may also retrieve the audio modeling data from the 3-D memory unit, perform an audio function upon the object modeling data thereby producing 3-D audio data, and store the 3-D audio data within the audio/video memory unit.

The rendering unit is coupled to the microprocessor, the 3-D memory unit, and the audio/video memory unit. The rendering unit retrieves the object modeling data from the 3-D memory unit, performs a rendering function upon the object modeling data thereby producing image data, and stores the image data within the audio/video memory unit. The rendering function may include, for example, a shading operation performed upon the object modeling data. The shading operation may add the color black to a base color of a portion of the object, wherein the quantity of the color black added is in inversely proportional to the amount of illumination the portion receives from a light source.

The 3-D presentation data may be conveyed as a data packet having a header portion including the length of the data packet and a data portion including the 3-D presentation data. The object is to be displayed within a window defined within the boundaries of a display screen of the display device. The data packet may further include a control portion which defines the size and location of the window. Alternately, user input via the input device may select the size and location of the window. An on-screen display (OSD) unit within the audio/video decoder may be coupled to the microprocessor and operably coupled to the display device. The OSD unit may cause a textual message to be displayed upon the display device in response to a control signal from the microprocessor. The textual message may prompt the user to select the size and location of the window via the input device. The output signal of the input device may be used to determine the size and location of the window.

The object is displayed by superimposing the object upon a background image displayed upon the display screen of the display device. The audio/video memory unit may include a frame buffer portion, and the audio/video decoder may store the decoded video data in the frame buffer portion. The rendering unit may also store the image data within the frame buffer such that the image data overwrites decoded video data stored within the frame buffer by the audio/video decoder. The audio/video decoder may retrieve data from the frame buffer portion of the audio/video memory unit and provide the data as a video output signal.

Alternately, the frame buffer portion may include a decoded video portion and a sub-picture portion. The audio/video decoder may store the decoded video data in the decoded video portion, and the rendering unit may store the image data within the sub-picture portion. The audio/video decoder may retrieve decoded video data from the decoded video portion of the frame buffer and image data from the sub-picture portion of the frame buffer, and produce the video output signal by superimposing the image data upon the decoded video data.

The optical disk system may include a disk drive unit for retrieving the encoded video and audio data, the 3-D presentation data, and the navigation data from an optical disk (e.g., a DVD). The disk drive unit may provide the bitstream including the encoded video and audio data, the 3-D presentation data, and the navigation data to the audio/video decoder and the microprocessor.

The disk drive may be capable of both retrieving data from and storing data upon a "recordable" optical disk. The optical disk system may operate in a playback mode and a record mode. When the optical disk system is in the playback mode, the disk drive unit retrieves encoded video and audio data, 3-D presentation data, and navigation data from the optical disk as described above. In the playback mode, the microprocessor controls the operation of the disk drive unit in response to the navigation data. When the optical disk system is in the record mode, the audio/video decoder retrieves decoded video data and image data from the audio/video memory unit, encodes the decoded video data and the image data thereby producing encoded video and image data, and provides the encoded video and image data to the disk drive unit. The disk drive unit stores the encoded video and image data upon the recordable optical disk The audio/video decoder may encode the decoded video data and the image data in accordance with an MPEG standard (e.g., MPEG-2) and provide the resulting encoded video and image data to the disk drive unit as a bitstream. For example, the bitstream may be a DVD-compliant bitstream including a sub-picture unit (SPU) portion, and the image data may be conveyed using the SPU portion of the bitstream.

As described above, the audio/video memory unit may include a frame buffer portion. In the record mode, the audio/video decoder may retrieve the decoded video data and the image data from the frame buffer portion. The frame buffer portion may include a decoded video portion and a sub-picture portion. The audio/video decoder may retrieve the decoded video data from the decoded video portion and the image data from the sub-picture portion.

BRIEF DESCRIPTION OF THE DRAWINGS

Other objects and advantages of the invention will become apparent upon reading the following detailed description and upon reference to the accompanying drawings in which.

Figure 1:
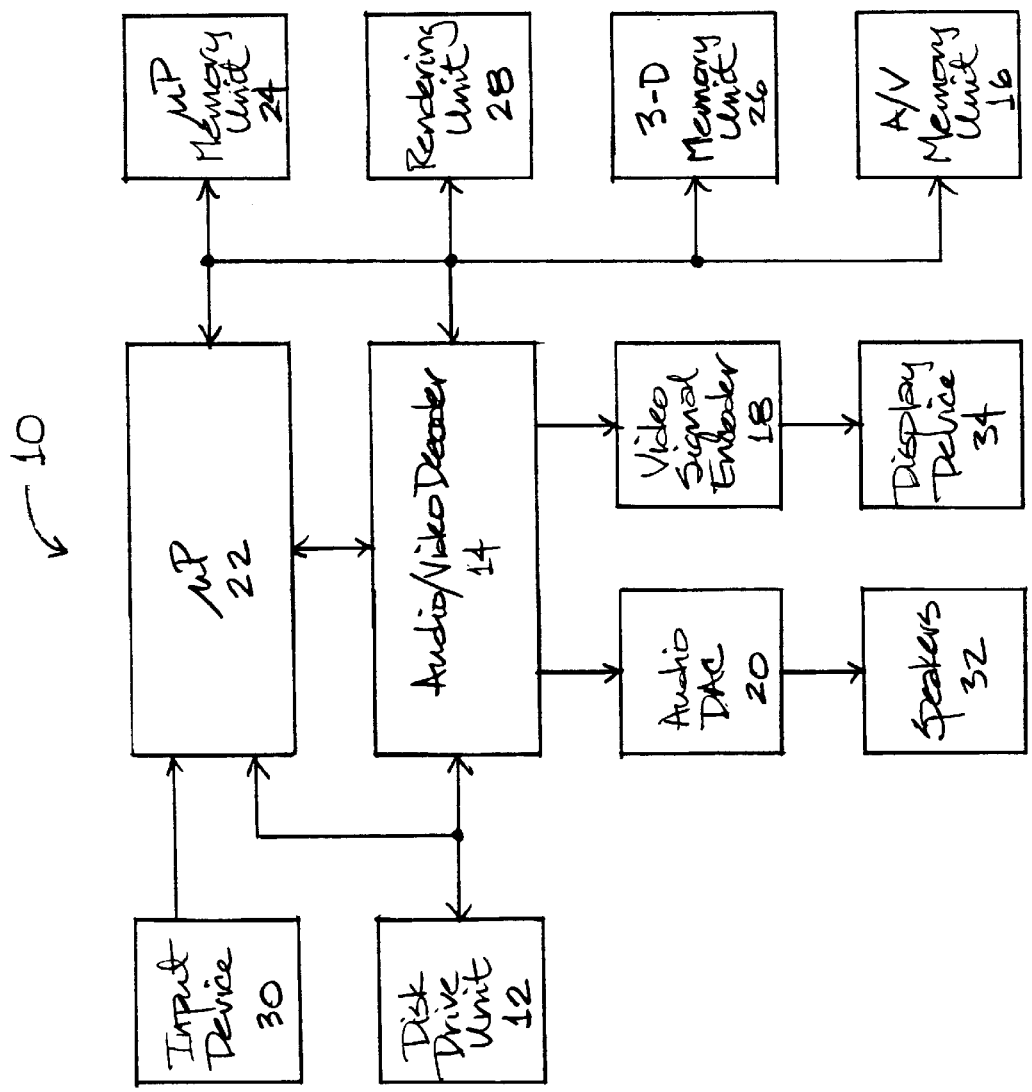
FIG. 1 is a block diagram of one embodiment of an optical disk system in accordance with the present invention, wherein the optical disk system includes an audio/video decoder coupled to an audio/video memory unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of one embodiment of an optical disk system 10 in accordance with the present invention. Optical disk system 10 includes a disk drive unit 12 for retrieving encoded video and audio data, three-dimensional (3-D) presentation data, and navigation data stored upon an optical disk. The encoded video data may be, for example, the result of encoding in accordance with an MPEG standard (e.g., MPEG-2). The encoded audio data may be, for example, the result of encoding in accordance with the Dolby® AC-3™ or MPEG audio standard. The 3-D presentation data may include, for example, object modeling data and audio modeling data. The object modeling data may include data pertaining to one or more objects to be displayed upon a display device, and the audio modeling data may include data pertaining to sound to be produced by two or more speakers. The optical disk may be placed within a designated area of a horizontal platform which slides in and out of disk drive unit 12. Alternately, disk drive unit 12 may have a slot for insertion of the optical disk. Disk drive unit 12 produces a serial stream or train of bits (i.e., a bitstream) which includes the encoded video and audio data, the 3-D presentation data, and the navigation data.

Optical disk system 10 also includes an audio/video decoder 14 which receives the bitstream produced by disk drive unit 12, obtains the encoded video and audio data from the bitstream, and decodes the encoded video and audio data thereby producing decoded video and audio data. Audio/video decoder 14 stores the decoded video data in a frame buffer portion of an audio/video memory unit 16 coupled to audio/video decoder 14. Audio/video decoder 14 also stores the decoded audio data in an audio buffer portion of audio/video memory unit 16. Audio/video decoder 14 subsequently retrieves decoded video data from the frame buffer and decoded audio from the audio buffer and synchronizes the decoded video and audio data. Audio/video decoder 14 provides the decoded video data to a video signal encoder 18, and provides the decoded audio data to an audio digital to analog converter (DAC) 20. A suitable audio/video decoder is the model L64020 source decoder (LSI Logic, Milpitas, Calif.).

Optical disk system 10 also includes a microprocessor (μP) 22 which controls the operations of the various components of optical disk system 10. Microprocessor 22 executes software instructions stored within a microprocessor (μP) memory unit 24 coupled to microprocessor 22. For example, microprocessor 22 may execute instructions of a real time operating system (RTOS) stored within microprocessor memory unit 24. Microprocessor 22 may also execute instructions of 3-D application software stored within microprocessor memory unit 24, thereby forming a 3-D "engine".

Microprocessor 22 receives the bitstream produced by disk drive unit 12 and obtains the 3-D presentation data and the navigation data from the bitstream. As described above, the 3-D presentation data includes object modeling data and audio modeling data. Microprocessor 22 stores the object modeling data and the audio modeling data in a 3-D memory unit 26 coupled to microprocessor 22. Microprocessor 22 may subsequently retrieve the object modeling data from 3-D memory unit 26, perform a graphics function upon the object modeling data producing intermediate or final image data, and store the intermediate or final image data within 3-D memory unit 26. Similarly, microprocessor 22 may subsequently retrieve the audio modeling data from 3-D memory unit 26, perform an audio function upon the audio modeling data producing intermediate or final 3-D audio data, and store the intermediate or final 3-D audio data within 3-D memory unit 26.

Microprocessor 22 may, for example, execute at least a portion of the x86 instruction set. Microprocessor 22 may also include, for example, hardware necessary to support the multimedia extension (MMX™) superset of the x86 instruction set. Alternately, microprocessor 22 may execute software which emulates hardware execution of MMX™ instructions. MMX™ instructions accelerate multimedia and communications computations. Microprocessor 22 may also be configured to execute instructions not included in either the x86 instruction set or the MMX™ superset.

The 3-D presentation data may also include software instructions to be executed by microprocessor 22 in order to display the object or generate 3-D sound. Microprocessor 22 stores such instructions within microprocessor memory unit 24, and subsequently retrieves and executes the instructions.

Optical disk system 10 also includes a rendering unit 28 coupled to microprocessor 22 and 3-D memory unit 26. Microprocessor 22 controls the operations of rendering unit 28. Rendering unit 28 retrieves object modeling data from 3-D memory unit 26 and performs a rendering function upon the object modeling data in order to produce image data. Rendering unit 28 may also retrieve intermediate image data produced by microprocessor 22 from 3-D memory unit 26 and perform a rendering function upon the intermediate image data, thereby producing final image data. As will be described in detail below, the rendering function adds a 3-D quality to images created using the image data. Rendering unit 28 stores the image data within audio/video memory unit 16.

Optical disk system 10 also includes an input device 30 coupled to microprocessor 22. Input device 30 produces an output signal in response to a user input. Input device 30 may be, for example, a mouse, a joystick, or a keyboard. The coupling between input device 30 and microprocessor 22 may include one or more electrical conductors (i.e., wires), or the coupling may be wireless (e.g., via radio or infra-red light waves). Input device 30 may include a keypad having multiple pressure-activated electrical switches (i.e., keys). As described above, microprocessor 22 obtains navigation data from the bitstream produced by disk drive unit 12. The navigation data defines a set of optional next sequences of encoded video data, encoded audio data, 3-D presentation data, and navigation data to be included in the bitstream. Microprocessor 22 selects a member of the set of locations of optional next sequences of encoded video data, 3-D presentation data, and navigation data by producing a control signal dependent upon the navigation data and the output signal produced by input device 30. Disk drive unit 12 receives the control signal and responds in order to provide the selected next sequences of encoded video data, 3-D presentation data, and navigation data.

Optical disk system 10 also includes two or more speakers 32 coupled to audio DAC 20 and a display device 34 coupled to video signal encoder 18. Audio DAC 20 receives digital audio data produced by audio/video decoder 14 and produces an analog audio signal. The analog audio signal is coupled to speakers 32. Speakers 32 convert the electrical energy of the analog audio signal into sound energy. Display device 34 may be, for example, a television. Video signal encoder 18 receives the digital video data produced by audio/video decoder 14 and produces an analog video signal, preferably according to a recognized standard television broadcast format (e.g., national television system committee or NTSC, phase alternate line or PAL, etc.). The analog video signal is coupled to display device 34. Display device 34 creates an image upon a display screen of display device 34 dependent upon the analog video signal.

The optical disk may be, for example, a DVD, and the bitstream produced by disk drive unit 12 may be a DVD-compliant bitstream having a sub-picture unit (SPU) portion. The SPU portion of a DVD-compliant bitstream is used to convey graphical image data (e.g., textual characters) to be displayed by superimposing the graphical image data upon a background image. The 3-D presentation data may be conveyed using the SPU portion of the bitstream. In other words, 3-D presentation data and 3-D graphics software may be mapped to the SPU syntax of a DVD-compliant bitstream and "streamed" into optical disk system 10. For example, the current SPU header syntax includes an unused "PES_priority" bit normally set to zero. By setting the PES_priority bit to one, 3-D presentation data may be identified and distinguished from normal SPU data.

Figure 2:
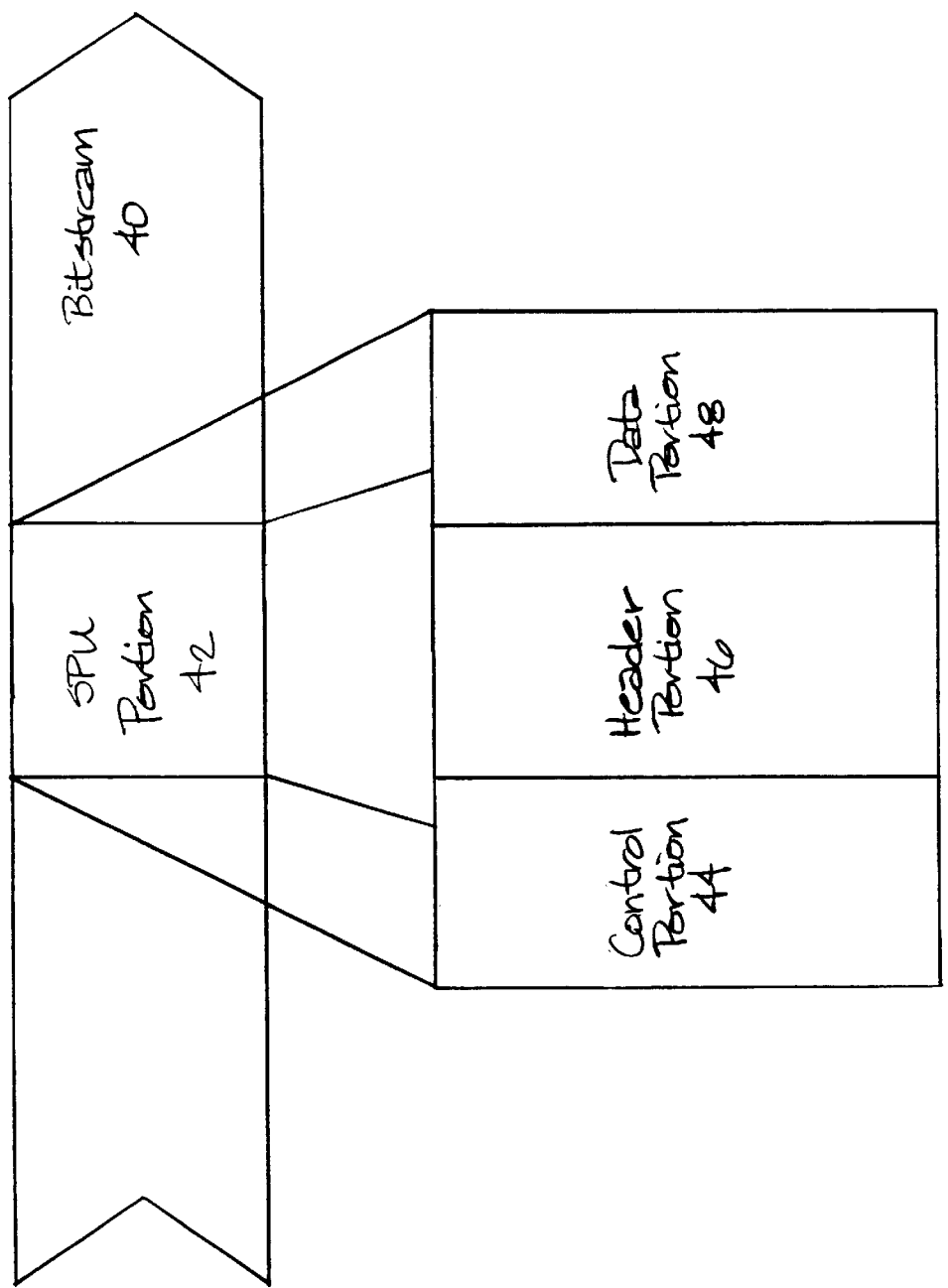
FIG. 2 is a diagram of a DVD-compliant serial train of bits (i.e., bitstream) including an SPU portion, wherein the SPU portion is a grouping or "packet" of data having a data portion, a header portion, and a control portion.

FIG. 2 is a diagram of a DVD-compliant bitstream 40 including an SPU portion 42. SPU portion 42 is a grouping or "packet" of data having a data portion 48, a header portion 46, and a control portion 44. Header portion 46 includes a value indicating the length of the data packet, and data portion 48 includes the 3-D presentation data. The object formed from the 3-D presentation data is to be displayed within a portion or "window" defined within the boundaries of the display screen of display device 34. Control portion 44 of the SPU data packet may define the size and location of the window as well as a display start time.

Figure 3:
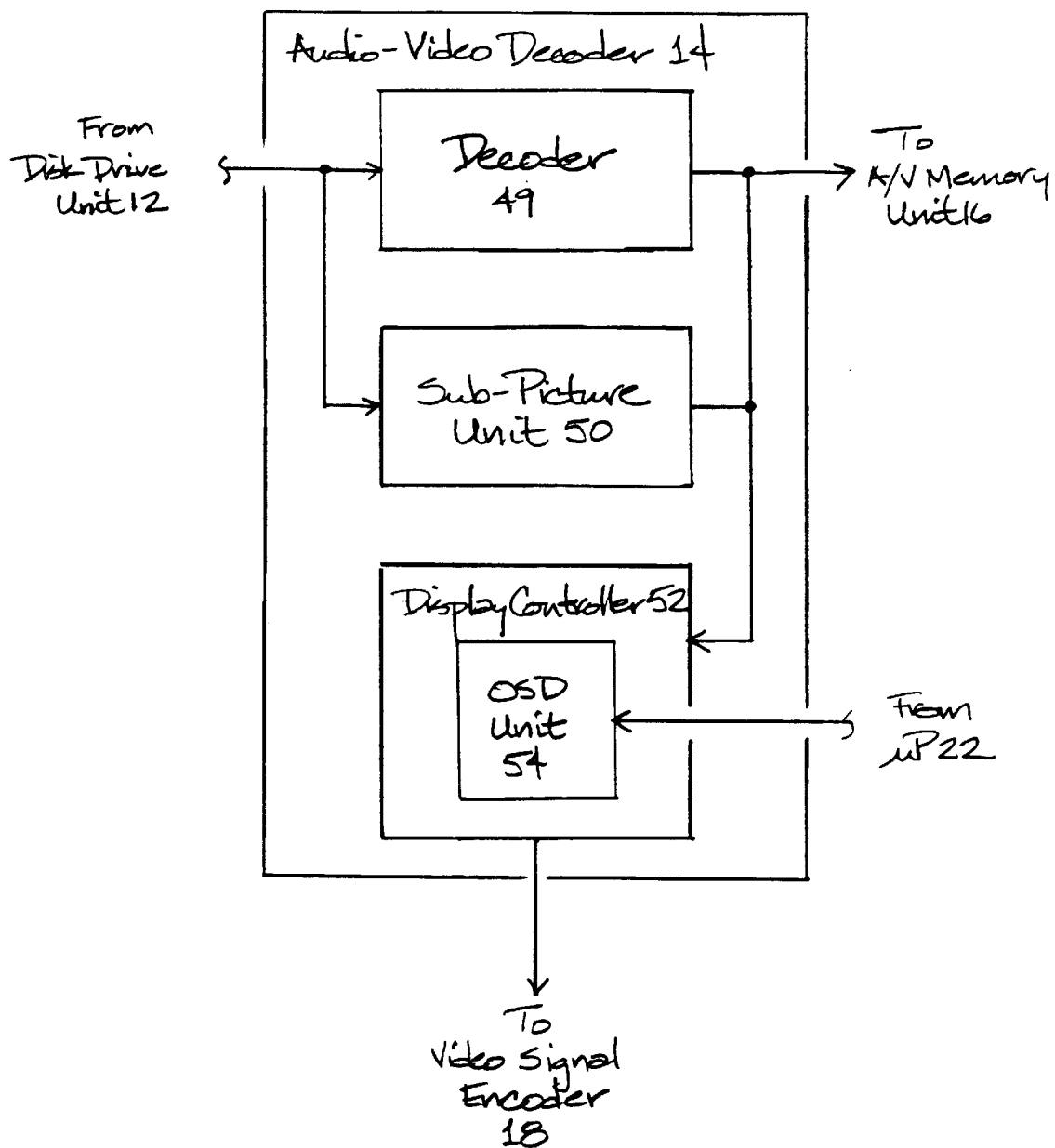
FIG. 3 is a block diagram of one embodiment of the audio/video decoder of FIG. 1, wherein the audio/video decoder includes a decoder, a sub-picture unit (SPU), and a display controller, and wherein the display controller includes an on-screen display (OSD) unit which superimposes image data (e.g., textual messages or "menus") upon "background" display data.

FIG. 3 is a block diagram of one embodiment of audio/video decoder 14 including a decoder 49, a sub-picture unit (SPU) 50, and a display controller 52. Decoder 49 receives the DVD-compliant bitstream produced by disk drive unit 12, obtains the encoded video and audio data from the bitstream, decodes the encoded video and audio data producing decoded video and audio data, and stores the decoded video and audio data within audio/video memory unit 16. SPU 50 also receives the DVD-compliant bitstream produced by disk drive unit 12, obtains SPU data from the SPU portion of the bitstream, and stores the SPU data within audio/video memory unit 16. Display controller 52 retrieves data from audio/video memory unit 16 and provides display data to video signal encoder 18. Display controller 52 includes a on-screen display (OSD) unit 54. OSD unit 54 superimposes image data (e.g., textual messages or "menus") upon "background" display data. OSD unit 54 is coupled to microprocessor 22 and operates in response to control signals from microprocessor 22. Following the display of a textual message or menu, the output signal of input device 30 may be used to configure playback of a 3-D presentation. For example, the output signal may be used to select the size and location of the window used for display of the object (i.e., playback of the 3-D presentation). When the 3-D presentation is a game, the output signal may be used to select difficulty (i.e., skill) level, and may also be used to select whether input device 30 is a joystick, a keyboard, etc.

Figure 4A:
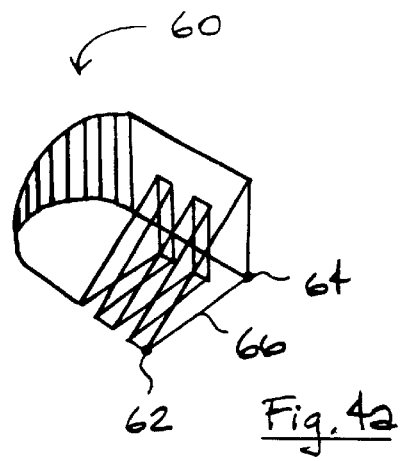
FIG. 4a is a perspective view of a wireframe model of an object, wherein the object is modeled as a collection of adjacent flat surfaces having three or more straight line edges, and wherein each edge of the object is represented by a straight line between two "corner" points.
Figure 4B:
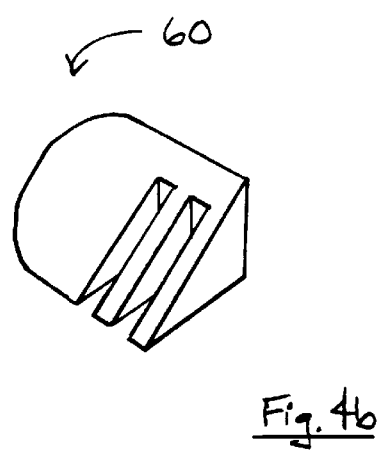
FIG. 4b is a perspective view of the object of FIG. 4a following hidden line removal.
Figure 4C:
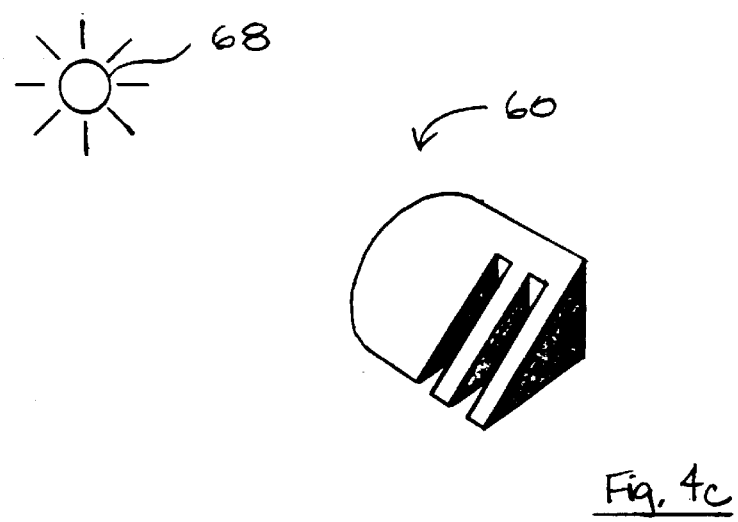
FIG. 4c is a perspective view of the object of FIG. 4b following the fixing of the position of a light source relative to the object and a subsequent shadowing operation.

FIGS. 4a–c will now be used to describe how the rendering function adds a 3-D quality to an image of an object created from the 3-D presentation data. The first step in a rendering process may be to model the object as a collection of adjacent flat surfaces having three or more straight line edges, forming a "wireframe" model of the object. FIG. 4a is a perspective view of a wireframe model of an object 60. Each edge of object 60 is represented by a straight line between two "corner" points. For example, in FIG. 4a, one edge of object 60 is represented by a straight line 66 between a pair of points 62 and 64. The orientation of straight line 66 is determined by the locations of points 62 and 64, and the locations of points 62 and 64 are fixed by their coordinates. Thus the 3-D presentation data may include coordinate locations of pairs of points which define straight lines used to model the object.

The next step in a rendering process may be to remove portions of the straight lines which would not be visible to a viewer (i.e., "hidden line removal"). FIG. 4b is a perspective view of object 60 following hidden line removal. The hidden line removal operation helps make object 60 appear solid.

Following hidden line removal, a shading operation may be performed to make the image appear more realistic and lifelike. The position of a light source (i.e., a source of illumination) is fixed relative to the object. Any of several known shading operations (e.g., Gouraud shading, Phong shading, ray tracing, etc.) may then be performed to add the color black to base colors of each flat surface (i.e., portion) of the object. The quantity of the color black added is in inversely proportional to the amount of illumination each portion of the object receives from the light source. FIG. 4c is a perspective view of object 60 following the fixing of the position of a light source 68 relative to object 60 and a subsequent shadowing operation.

Figure 5:
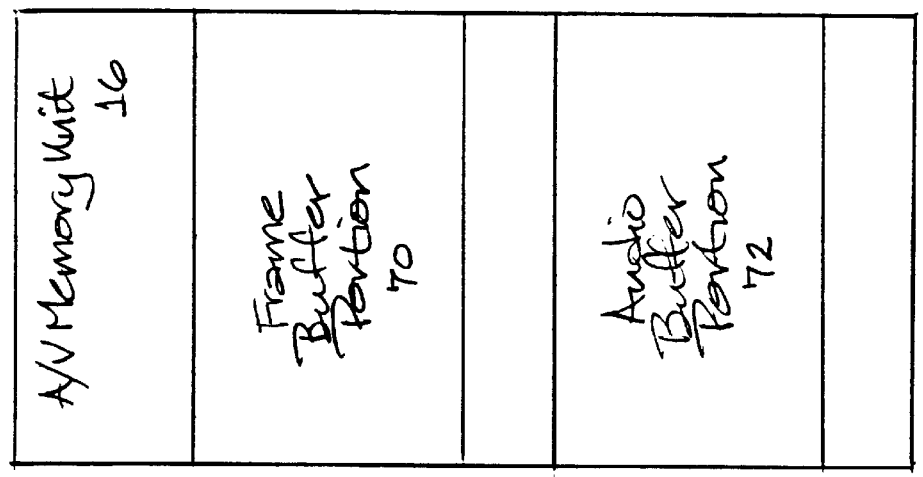
FIG. 5 is a block diagram of one embodiment of the audio/video memory unit of FIG. 1, wherein the audio/video memory unit includes a frame buffer portion for storing decoded video data and an audio buffer portion for storing decoded audio data.

The display and sound generation operations of optical disk system 10 will now be described. FIG. 5 is a block diagram of one embodiment of audio/video memory unit 16, wherein audio/video memory unit 16 includes a frame buffer portion 70 and an audio buffer portion 72. Audio/video decoder 14 stores decoded video data in frame buffer portion 70 and decoded audio data in audio buffer 72. Rendering unit 28 may store produced image data within frame buffer portion 70 such that the image data overwrites the decoded video data stored within frame buffer portion 70 by audio/video decoder 14. Audio/video decoder 14 retrieves video data from frame buffer portion 70, retrieves audio data from audio buffer portion 72, synchronizes the video and audio data, provides the video data to video signal encoder 18, and provides the audio data to audio DAC 20.

Figure 6:
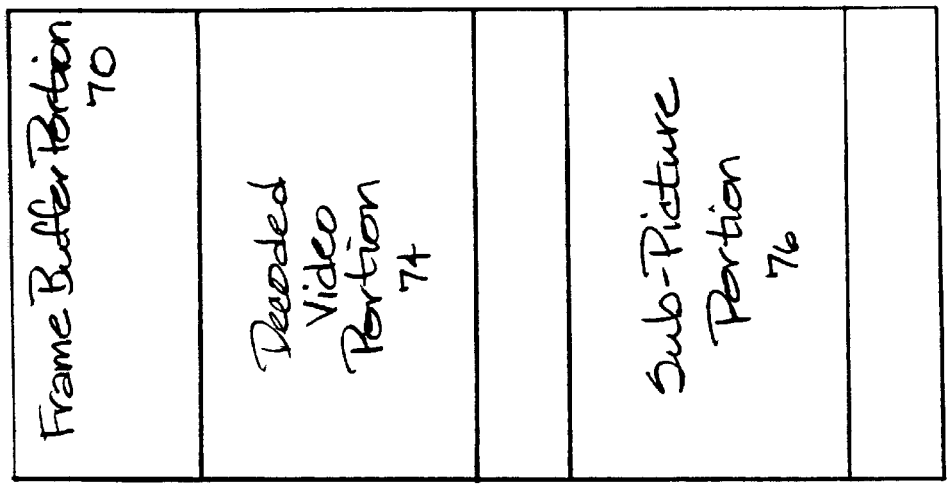
FIG. 6 is a block diagram of one embodiment of the frame buffer portion of the audio/video memory unit of FIG. 5, wherein the frame buffer portion includes a decoded video portion for storing decoded video data and a sub-picture portion for storing image data.

When the optical disk is a DVD disk and the bitstream produced by disk drive unit 12 is a DVD-compliant bitstream, optical disk system 10 may take advantage of the display capabilities afforded by the SPU portion of the DVD-compliant bitstream. FIG. 6 is a block diagram of one embodiment of frame buffer portion 70 of audio/video memory unit 16, wherein frame buffer portion 70 includes a decoded video portion 74 and a sub-picture portion 76. Audio/video decoder 14 stores decoded video data in decoded video portion 74 of frame buffer portion 70. Rendering unit 28 may store produced image data within sub-picture portion 76 of frame buffer portion 70. Audio/video decoder 14 may retrieve video data from both decoded video portion 74 and sub-picture portion 76 of frame buffer portion 70, superimpose the video data from sub-picture portion 76 upon the video data from decoded video portion 74, and provide the resultant video data to video signal encoder 18.

Disk drive unit 12 may be able to both retrieve data from and store data upon a "recordable" optical disk, and optical disk system 10 may operate in a playback mode or a record mode. When optical disk system 10 is in the playback mode, disk drive unit 12 retrieves encoded video and audio data, 3-D presentation data, and navigation data from the optical disk as described above. In the playback mode, microprocessor 22 controls the operation of disk drive unit 12 in response to the navigation data. When optical disk system 10 is in the record mode, audio/video decoder 14 retrieves decoded video data and image data from audio/video memory unit 16, encodes the decoded video data and the image data thereby producing encoded video and image data, and provides the encoded video and image data to disk drive unit 12. Audio/video decoder 14 may convey the encoded video and image data to the disk drive unit as a bitstream. For example, the bitstream may be a DVD-compliant bitstream including a sub-picture unit (SPU) portion, and the image data may be conveyed using the SPU portion of the bitstream. Disk drive unit 12 stores the encoded video and image data upon the optical disk.

As described above, audio/video memory unit 16 may include a frame buffer portion 70. In the record mode, audio/video decoder 14 retrieves the decoded video data and the image data from frame buffer portion 70. Frame buffer portion 70 may include a decoded video portion 74 and a sub-picture portion 76. Audio/video decoder 14 may retrieve the decoded video data from decoded video portion 74 and the image data from sub-picture portion 76.

Numerous variations and modifications will become apparent to those skilled in the art once the above disclosure is fully appreciated. It is intended that the following claims be interpreted to embrace all such variations and modifications.

What is claimed is:

1. An optical disk system, comprising:

an audio/video decoder coupled to receive a bitstream including encoded video data, three-dimensional (3-D) presentation data, and navigation data, wherein the 3-D presentation data includes object modeling data and audio modeling data, and wherein the audio/video decoder is configured to obtain the encoded video data from the bitstream, decode the encoded video data thereby producing decoded video data, and store the decoded video data in an audio/video memory unit coupled to the audio/video decoder, wherein the bitstream is a DVD-compliant bitstream having an sub-picture unit (SPU) portion, and wherein the 3-D presentation data is conveyed using the SPU portion of the bitstream;

a microprocessor coupled to receive the bitstream and configured to obtain the 3-D presentation data and the navigation data from the bitstream, store the 3-D presentation data in a 3-D memory unit coupled to the microprocessor, and produce a control signal in response to the navigation data; and a rendering unit coupled to the microprocessor, the 3-D memory unit, and the audio/video memory unit, wherein the rendering unit is configured to retrieve the object modeling data from the 3-D memory unit and to perform a rendering function upon the object modeling data thereby producing image data.

2. The optical disk system as recited in claim 1, wherein the optical disk system further comprises a display device operably coupled to the audio/video decoder, and wherein the object modeling data includes data pertaining to an object to be displayed upon the display device.

3. The optical disk system as recited in claim 1, wherein the optical disk system further comprises a plurality of speakers operably coupled to the audio/video decoder, and wherein the audio modeling data includes data pertaining to sound to be produced by the plurality of speakers.

4. The optical disk system as recited in claim 1, wherein the rendering function includes a shading operation performed upon the object modeling data.

5. The optical disk system as recited in claim 4, wherein the shading operation adds the color black to a base color of a portion of the object, and wherein the quantity of the color black added is in inversely proportional to the amount of illumination the portion receives from a light source.

6. The optical disk system as recited in claim 2, wherein the object modeling data includes the coordinate locations of pairs of points which define straight lines used to model the object.

7. The optical disk system as recited in claim 1, wherein the microprocessor is coupled to the audio/video memory unit, and wherein the microprocessor is further configured to retrieve the object modeling data from the 3-D memory unit, to perform a graphics function upon the object modeling data thereby producing image data, and to store the image data within the audio/video memory unit.

8. The optical disk system as recited in claim 1, wherein the microprocessor is coupled to the audio/video memory unit, and wherein the microprocessor is further configured to retrieve the audio modeling data from the 3-D memory unit, to perform an audio function upon the object modeling data thereby producing 3-D audio data, and to store the 3-D audio data within the audio/video memory unit.

9. The optical disk system as recited in claim 1, wherein the 3-D presentation data includes instructions executed by the microprocessor in order to perform the graphics function.

10. The optical disk system as recited in claim 1, wherein the 3-D presentation data includes instructions executed by the microprocessor in order to perform the audio function.

11. The optical disk system as recited in claim 2, wherein the 3-D presentation data is conveyed as a data packet having a header portion including the length of the data packet and a data portion including the 3-D presentation data.

12. The optical disk system as recited in claim 11, wherein the object is to be displayed within a window defined within the boundaries of a display screen of the display device.

13. The optical disk system as recited in claim 12, further comprising an input device operably coupled to the microprocessor and configured to produce an output signal in response to a user input, and wherein the audio/video decoder comprises an on-screen display unit coupled to the microprocessor and operably coupled to the display device, and wherein the on-screen display unit is configured to cause a textual message to be displayed upon the display device in response to a control signal from the microprocessor, and wherein the output signal of the input device is used to determine the size and location of the window.

14. The optical disk system as recited in claim 12, wherein the data packet further includes a control portion, and wherein the control portion defines the size and location of the window.

15. The optical disk system as recited in claim 12, wherein the object is displayed by superimposing the object upon a background image displayed upon the display screen of the display device.

16. The optical disk system as recited in claim 1, wherein the bitstream comprises a serial train of bits.

17. The optical disk system as recited in claim 1, wherein the navigation data defines a set of optional next sequences of encoded video data, 3-D presentation data, and navigation data to be included in the bitstream.

18. The optical disk system as recited in claim 17, further comprising an input device operably coupled to the microprocessor and configured to produce an output signal in response to a user input, wherein the microprocessor produces the control signal in response to the output signal, and wherein the control signal selects a member of the set of optional next sequences of encoded video data, 3-D presentation data, and navigation data.

19. The optical disk system as recited in claim 1, wherein the audio/video memory unit includes a frame buffer portion, and wherein the audio/video decoder stores the decoded video data in the frame buffer portion.

20. The optical disk system as recited in claim 19, wherein the frame buffer portion includes a decoded video portion and a sub-picture portion, and wherein the audio/video decoder stores the decoded video data in the decoded video portion, and wherein the rendering unit is further configured to store the image data within the sub-picture portion.

21. The optical disk system as recited in claim 20, wherein the audio/video decoder is further configured to retrieve decoded video data from the decoded video portion of the frame buffer and image data from the sub-picture portion of the frame buffer, and wherein the audio/video decoder is further configured to produce a video output signal by superimposing the image data upon the decoded video data.

22. The optical disk system as recited in claim 19, wherein the rendering unit is further configured to store the image data within the frame buffer such that the image data overwrites decoded video data stored within the frame buffer by the audio/video decoder, and wherein the audio/video decoder is further configured to retrieve data from the frame buffer portion of the audio/video memory unit and to provide the data as a video output signal.

23. The optical disk system as recited in claim 1, wherein the encoded video data is encoded using the MPEG-2 standard.

24. An optical disk system, comprising:
a disk drive unit for retrieving encoded video data, 3-D presentation data, and navigation data stored upon an optical disk, wherein the disk drive unit produces the encoded video data, 3-D presentation data, and navigation data as a DVD-compliant bitstream having an sub-picture unit (SPU) portion, and wherein the 3-D presentation data is conveyed using the SPU portion of the bitstream;

an audio/video decoder coupled to receive the encoded video data from the disk drive unit and configured to decode the encoded video data thereby producing decoded video data, and to store the decoded video data in an audio/video memory unit coupled to the audio/video decoder;

a microprocessor coupled to receive the 3-D presentation data and the navigation data from the disk drive unit and configured to store the 3-D presentation data in a 3-D memory unit coupled to the microprocessor, and to control the operation of the disk drive unit in response to the navigation data; and a rendering unit coupled to the microprocessor, the 3-D memory unit, and the audio/video memory unit, wherein the rendering unit is configured to retrieve the 3-D presentation data from the 3-D memory unit and to perform a rendering function upon the 3-D presentation data thereby producing image data.

25. The optical disk system as recited in claim 24, wherein the optical disk is a DVD.

26. The optical disk system as recited in claim 24, wherein the 3-D presentation data includes data pertaining to an object to be displayed upon a display device.

27. The optical disk system as recited in claim 24, wherein the 3-D presentation data includes instructions and data executed by the microprocessor in order to display the object.

28. The optical disk system as recited in claim 22, wherein the 3-D presentation data is conveyed as a data packet having a header portion including the length of the data packet, a data portion including the 3-D presentation data, and a control portion.

29. The optical disk system as recited in claim 28, wherein the object is to be displayed within a window defined within the boundaries of a display screen of a display device, and wherein the control portion of the data packet defines the size and location of the window and a display start time.

30. The optical disk system as recited in claim 29, wherein the object is displayed by superimposing the object upon a background image displayed upon the display screen of the display device.

31. The optical disk system as recited in claim 24, wherein the navigation data defines a set of locations of optional next sequences of encoded video data, 3-D presentation data, and navigation data to be retrieved from the optical disk.

32. The optical disk system as recited in claim 31, further comprising an input device operably coupled to the microprocessor and configured to produce an output signal in response to a user input, wherein the microprocessor selects a member of the set of locations of optional next sequences of encoded video data, 3-D presentation data, and navigation data dependent upon the output signal.

33. The optical disk system as recited in claim 24, wherein the audio/video memory unit includes a frame buffer portion, and wherein the audio/video decoder stores the decoded video data in the frame buffer portion.

34. The optical disk system as recited in claim 33, wherein frame buffer portion includes a decoded video portion and a sub-picture portion, and wherein the audio/video decoder stores the decoded video data in the decoded video portion, and wherein the rendering unit is further configured to store the image data within the sub-picture portion.

35. The optical disk system as recited in claim 34, wherein the audio/video decoder is further configured to retrieve decoded video data from the decoded video portion of the frame buffer and image data from the sub-picture portion of the frame buffer, and wherein the audio/video decoder is further configured to produce a video output signal by superimposing the image data upon the decoded video data.

36. The optical disk system as recited in claim 33, wherein the rendering unit is further configured to store the image data within the frame buffer such that the image data overwrites decoded video data stored within the frame buffer by the audio/video decoder, and wherein the audio/video decoder is further configured to retrieve data from the frame buffer portion of the audio/video memory unit and to provide the data as a video output signal.

37. An optical disk system, comprising:
   a disk drive unit for retrieving data from and storing data upon an optical disk;
   a 3-D memory unit for storing data;
   an audio/video memory unit for storing data, wherein the audio/video memory unit includes a frame buffer portion, and wherein when the optical disk system is in the playback mode the audio/video decoder stores the decoded video data in the frame buffer portion, and wherein when the optical disk system is in the record mode the audio/video decoder retrieves the decoded video data from the frame buffer portion, wherein the frame buffer portion includes a decoded video portion and a sub-picture portion
   a microprocessor coupled between the disk drive unit and the 3-D memory unit;
   an audio/video decoder coupled between the disk drive unit and the audio/video memory unit; and
   a rendering unit coupled to the microprocessor, the 3-D memory unit, and the audio/video memory unit;
   wherein the optical disk system operates in a playback mode and a record mode, and wherein when the optical disk system is in the playback mode:
      the disk drive unit retrieves encoded video data, 3-D presentation data, and navigation data from an optical disk and provides the encoded video data, 3-D presentation data, and navigation data;
      the microprocessor receives the 3-D presentation data and the navigation data from the disk drive unit and stores the 3-D presentation data in the 3-D memory unit;
      the audio/video decoder receives the encoded video data from the disk drive unit, decodes the encoded video data thereby producing decoded video data, and stores the decoded video data in the audio/video memory unit;
      the audio/video decoder stores the decoded video data in the decoded video portion;
      the rendering unit stores the image data within the sub-picture portion; and
      the rendering unit retrieves the 3-D presentation data from the 3-D memory unit, performs a rendering function upon the 3-D presentation data thereby producing image data, and stores the image data within the audio/video memory unit; and
   wherein when the optical disk system is in the record mode:
      the audio/video decoder retrieves decoded video data and image data from the audio/video memory unit, encodes the decoded video data and the image data thereby producing encoded video and image data, and provides the encoded video and image data to the disk drive unit;
      the audio/video decoder retrieves the decoded video data from the decoded video portion and the image data from the sub-picture portion; and
      the disk drive unit stores the encoded video and image data upon the optical disk.

38. The optical disk system as recited in claim 37, wherein the optical disk is a recordable DVD.

39. The optical disk system as recited in claim 37, wherein when the optical disk system is in the playback mode the microprocessor controls the operation of the disk drive unit in response to the navigation data.

40. The optical disk system as recited in claim 37, wherein the 3-D presentation data includes data pertaining to an object to be displayed upon a display device.

41. The optical disk system as recited in claim 37, wherein when the optical disk system is in the record mode the audio/video decoder conveys the encoded video and image data to the disk drive unit as a DVD-compliant bitstream including a sub-picture unit (SPU) portion, and wherein the image data is conveyed using the SPU portion of the bitstream.

42. An optical disk system, comprising:
   an audio/video decoder coupled to receive a bitstream including encoded video data, three-dimensional (3-D) presentation data, and navigation data, wherein the 3-D presentation data includes object modeling data and audio modeling data, and wherein the audio/video decoder is configured to obtain the encoded video data from the bitstream, decode the encoded video data thereby producing decoded video data, and store the decoded video data in an audio/video memory unit coupled to the audio/video decoder, wherein the navigation data defines a set of optional next sequences of encoded video data, 3-D presentation data, and navigation data to be included in the bitstream;
   a microprocessor coupled to receive the bitstream and configured to obtain the 3-D presentation data and the navigation data from the bitstream, store the 3-D presentation data in a 3-D memory unit coupled to the microprocessor, and produce a control signal in response to the navigation data; and
   a rendering unit coupled to the microprocessor, the 3-D memory unit, and the audio/video memory unit, wherein the rendering unit is configured to retrieve the object modeling data from the 3-D memory unit and to perform a rendering function upon the object modeling data thereby producing image data.

43. An optical disk system, comprising:
   a disk drive unit for retrieving encoded video data, 3-D presentation data, and navigation data stored upon an optical disk, wherein the navigation data defines a set of locations of optional next sequences of encoded video data, 3-D presentation data, and navigation data to be retrieved from the optical disk;
   an audio/video decoder coupled to receive the encoded video data from the disk drive unit and configured to decode the encoded video data thereby producing decoded video data, and to store the decoded video data in an audio/video memory unit coupled to the audio/ video decoder;
   a microprocessor coupled to receive the 3-D presentation data and the navigation data from the disk drive unit and configured to store the 3-D presentation data in a 3-D memory unit coupled to the microprocessor, and to control the operation of the disk drive unit in response to the navigation data; and a rendering unit coupled to the microprocessor, the 3-D memory unit, and the audio/video memory unit, wherein the rendering unit is configured to retrieve the 3-D presentation data from the 3-D memory unit and to perform a rendering function upon the 3-D presentation data thereby producing image data.

\* \* \* \* \*